United States Patent [19]

Dolin et al.

[11] 3,711,708
[45] Jan. 16, 1973

[54] RAPID SCAN IDENTIFIER FOR USE IN INFRARED ABSORPTION SPECTROSCOPY

[75] Inventors: Stanley A. Dolin, Roslyn Heights; Andres Folch, Jr.; Dana F. Geiger, both of New York, all of N.Y.

[73] Assignee: Optical Coating Laboratory, Inc., Santa Rosa, Calif.

[22] Filed: Feb. 25, 1971

[21] Appl. No.: 118,923

[52] U.S. Cl..................250/43.5 R, 356/51, 356/97, 356/246
[51] Int. Cl..............................................G01n 21/26
[58] Field of Search............250/43.5; 356/88, 93–97, 356/205, 206, 244, 246

[56] References Cited

UNITED STATES PATENTS

| | | | |
|---|---|---|---|
| 3,497,302 | 3/1970 | Tipotsch | 356/97 X |
| 3,537,797 | 11/1970 | Matthews | 356/93 |
| 2,970,513 | 2/1961 | Waters | 250/43.5 R |
| 3,554,648 | 1/1971 | Boostrom et al. | 356/96 |
| 3,144,498 | 8/1964 | Alpert et al. | 356/93 |
| 3,536,558 | 10/1970 | Lipkins | 350/96 T X |
| 3,120,608 | 2/1964 | Bird | 250/43.5 R |

*Primary Examiner*—John K. Corbin
*Attorney*—Flehr, Hohbach, Test, Albritton and Herbert

[57] ABSTRACT

A rapid scan spectrum identifier for use in identifying infrared spectrum of the output of a gas chromatograph to identify its absorption characteristics and includes an infrared source and beam splitter, a double beam chopper for alternately sending the infrared beam through a sample or reference gas cell mounted in a suitable furnace, the output of which is recombined and analyzed by a monochromator having a narrow output passband of energy detected by a rapid response detector, the output of which is processed by suitable electronic circuitry to provide a readout. The monochromator is of the scanning type in which a grating is synchronously scanned with a circular variable filter so that the first order output of the grating is selectively passed and higher orders rejected by the filter.

The sample and reference gas cell furnace assembly utilizes specially constructed sample and reference gas cells symmetrically mounted in a furnace arrangement for maintaining input gas streams at equal temperatures within each cell and above the temperature of condensation of the sample under investigation. The beam chopper contains associated photoelectronics for physically determining the location of a chopping blade to thereby provide gating signals for indicating the presence at the detector of a sample, reference, or a background signals. These grating signals are used in sample and hold circuits to convert an essentially digitally sampled output into a relatively smooth continuous curve indicative of the absorption of the sample so that the readout represents the sample absorption characteristics corrected for reference for the carrier gas and background effects. The instrument is designed to operate with scan rates of approximately 6 and 30 seconds.

20 Claims, 18 Drawing Figures

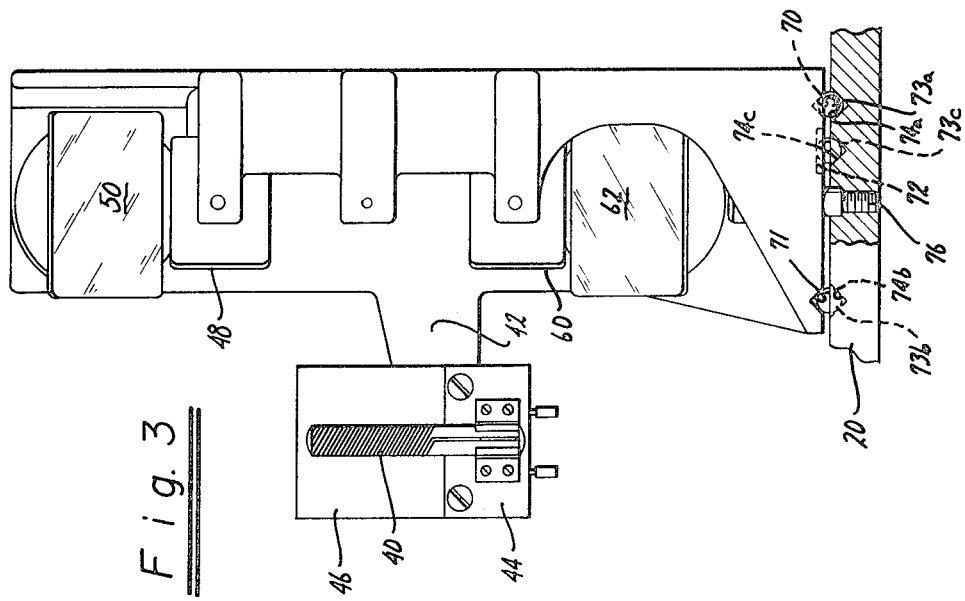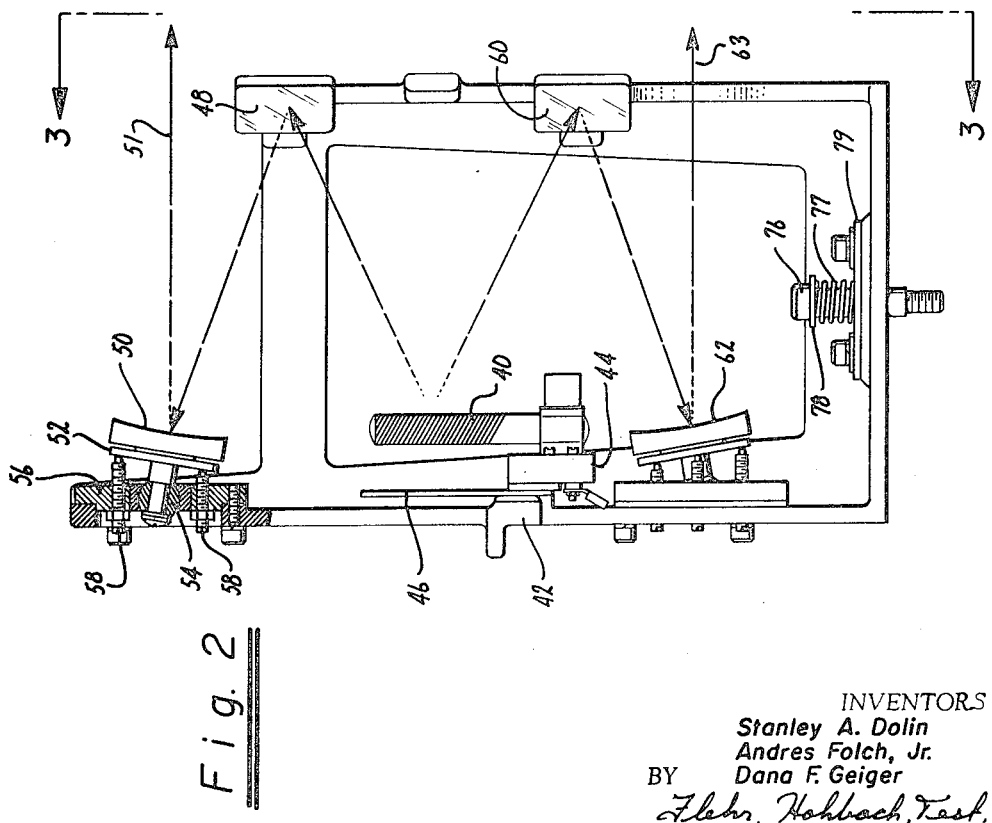

INVENTORS
Stanley A. Dolin
Andres Folch, Jr.
Dana F. Geiger
BY
Flehr, Hohbach, Test,
Albritton & Herbert
Attorneys

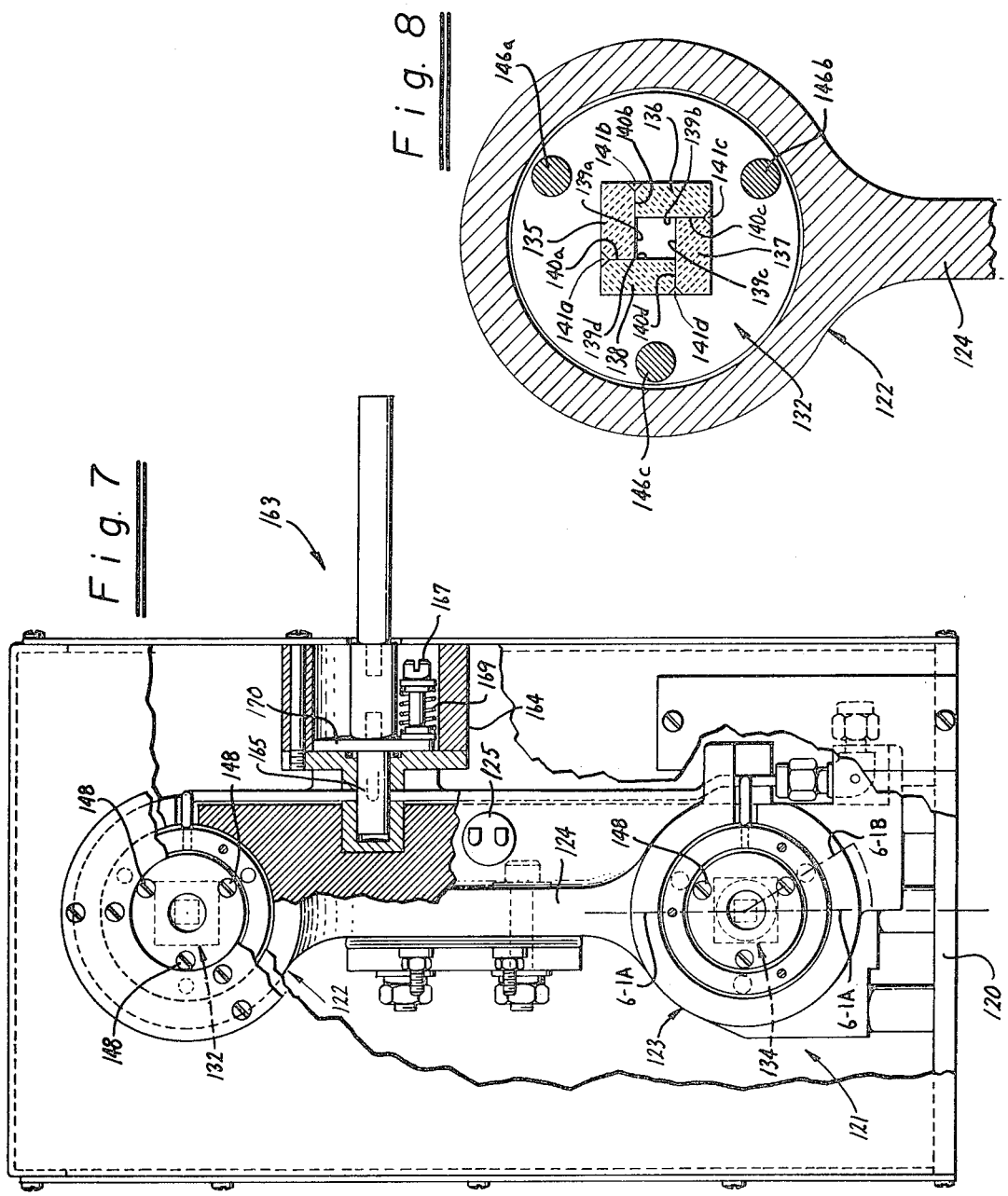

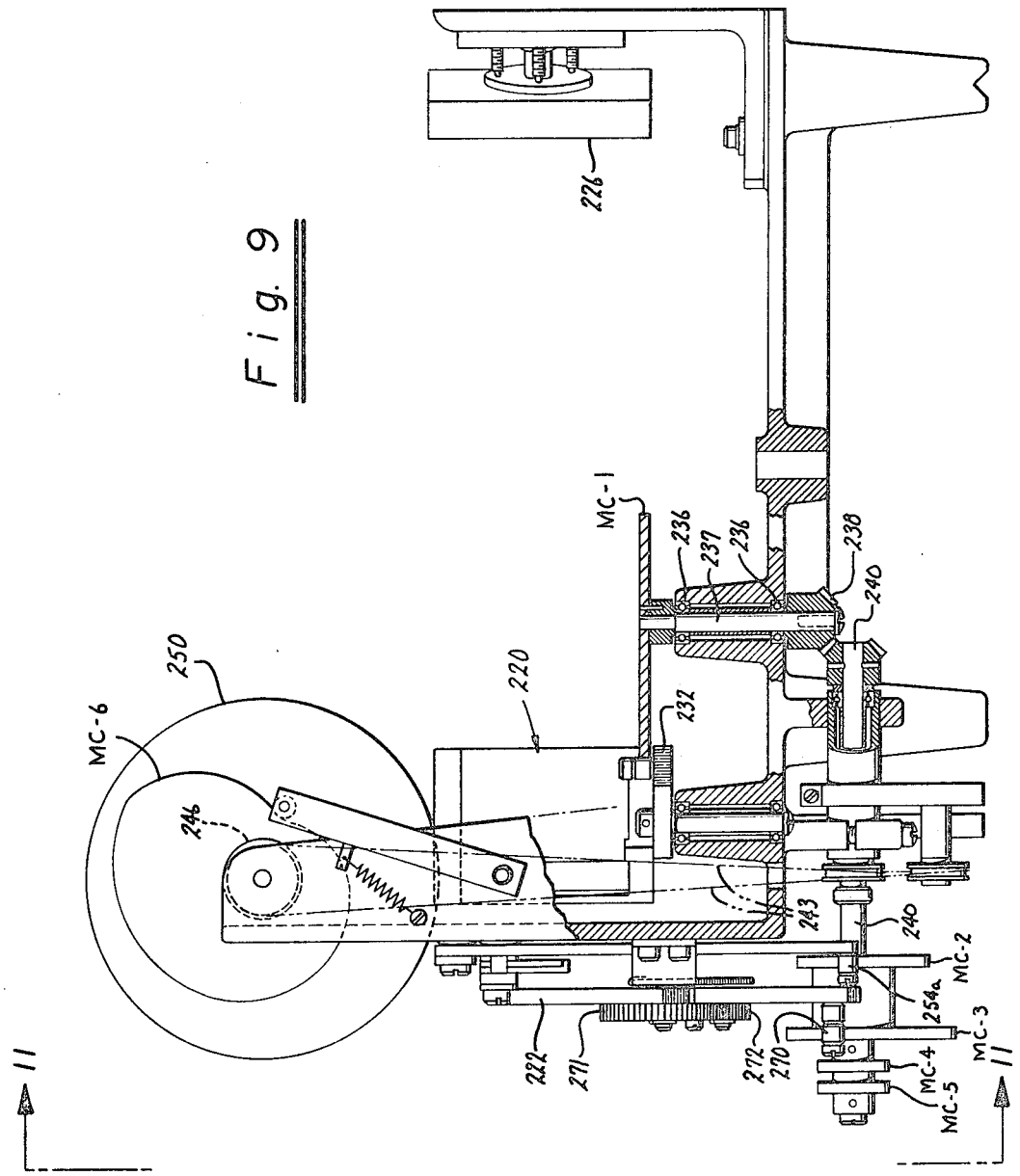

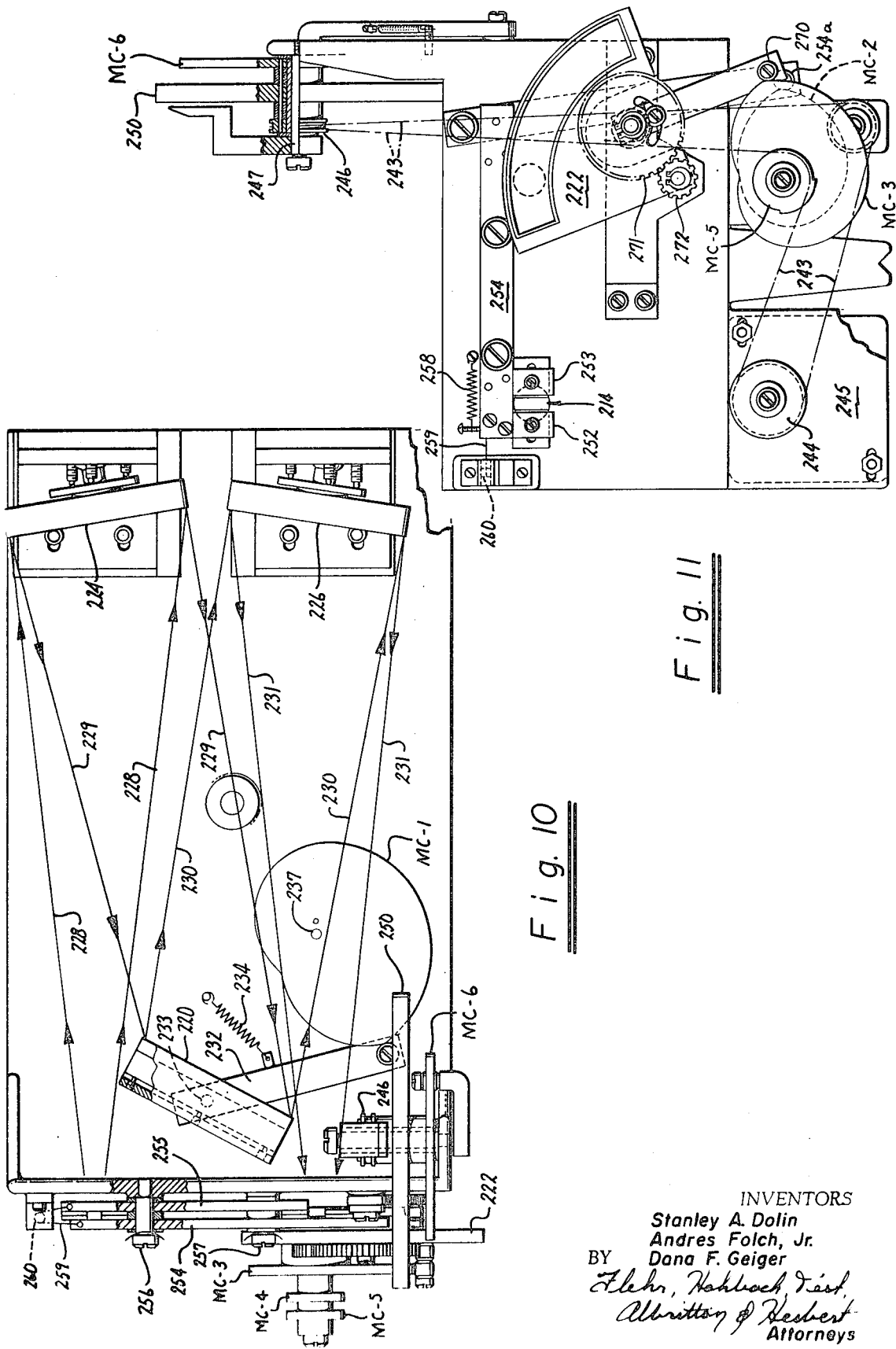

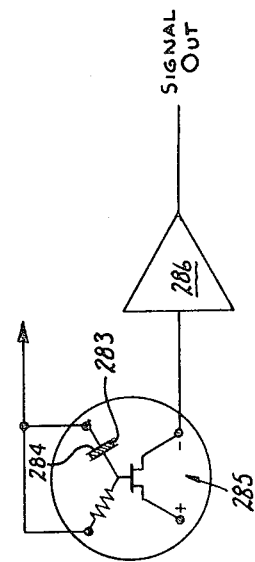
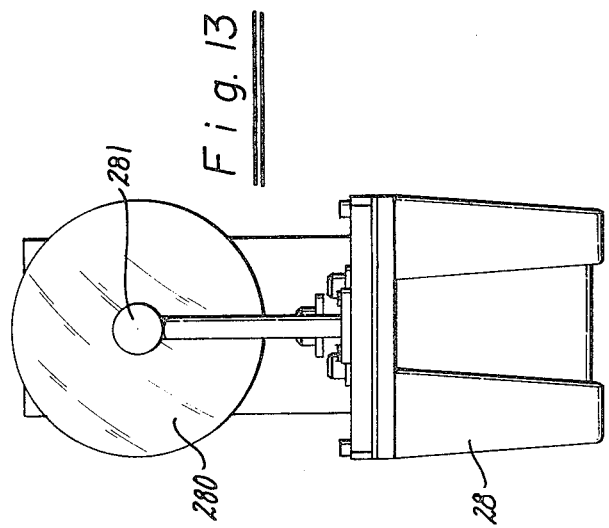
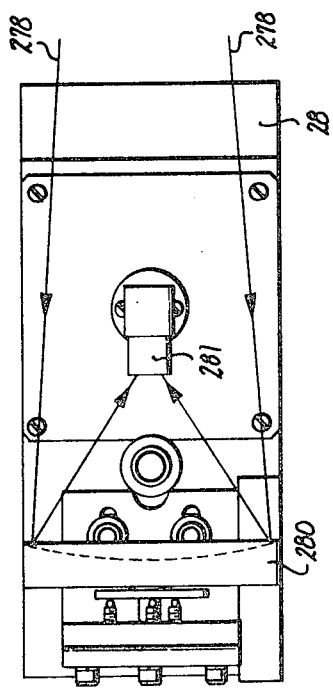
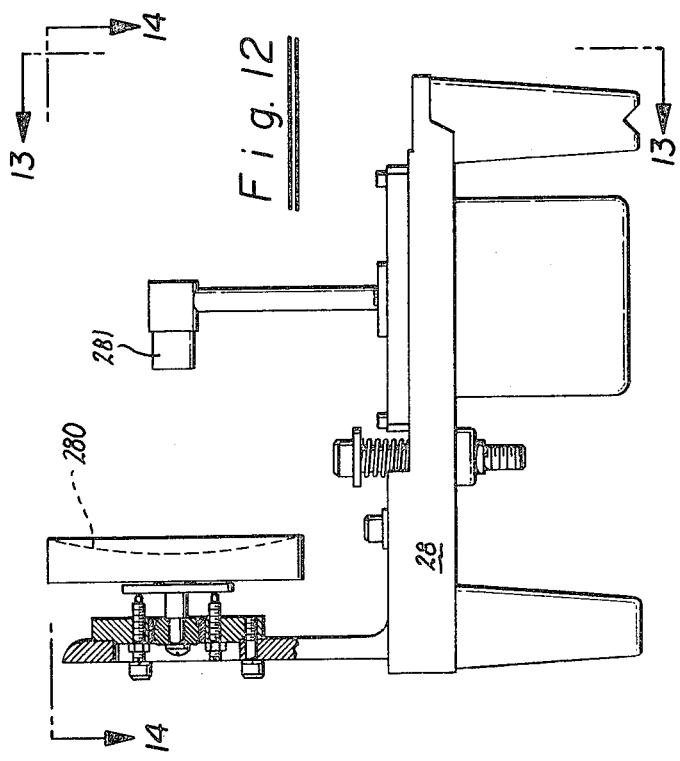

RAPID SCAN IDENTIFIER FOR USE IN INFRARED ABSORPTION SPECTROSCOPY

BACKGROUND OF THE INVENTION

This invention relates to rapid scanning identifiers for use in infrared spectroscopy, particularly for such instrument adapted to receive the output of a gas chromatograph for analysis of its infrared absorption characteristic and to a gas absorption cell and furnace for use with the same.

In general, infrared spectrometers for use in infrared absorption spectral analysis of gases from gas chromatography have been known. The output of a gas chromatograph usually consists of a carrier gas into which a sample has been vaporized and separated into fractions by differential absorption. As so separated the sample gas can be continuously or trap analyzed by an infrared spectrometer, and after compared by the transmission ratio $T = S/R$ with sample absorption $S$ to $R$ carrier gas absorption $R$. It will, of course, be understood that the terms transmission and absorption are interchangeable, and that spectrometers of this type are not limited to even these outputs since the basic data generated can be cast or organized in various forms depending upon the physical measurement, the degree of correction and accuracy desired.

Grating instruments have generally been limited by the rate of continuous scan permitted, since adequate monochromator bandwidth has required physical removal and substitution of filters during a given scan to eliminate higher order spectra from monochromator gratings. Also, common detectors have had inherently slow responses to changes in input, and general inefficiencies of prior gas cells and furnace constructions have limited the sensitivity to which such instruments have been operable.

Many spectrometers are known in which the general construction requires use of the optical bench or other high quality surface, usually lineal, so that interchangeable use and replacements of separate prealigned assemblies has not been widely known.

There is therefore, a need for a new and improved infrared spectrometer for use in analyzing samples from gas chromatographs.

SUMMARY OF THE INVENTION AND OBJECTS

In general, it is an object of the present invention to provide a new and improved infrared spectrometer which will overcome the above limitations and disadvantages and particularly find use in the rapid scanning of the absorption spectra of the output of gas chromatographs.

Another object of the invention is to provide an infrared spectrometer of the above character having a particularly novel gas sample-reference cell and furnace construction which is highly efficient and which uses highly efficient, physically and chemically stable cells arranged in a convenient and uniform heated furnace.

Another object of the invention is to provide an infrared spectrometer of the above character using a fast response pyroelectric transducer for converting an infrared scan output into an electrical signal by change in capacitance and having a particularly low noise characteristic when operated in the fast scan mode.

Another object of the invention is to provide an infrared spectrometer of the above character having digital sampling circuits used to provide an essentially continuous smooth output fully utilizing the inherently fast response of the above detector and in which the resultant resolution and sensitivity of the instrument are balanced against the fast scan rates provided to obtain more useful spectral analysis of the majority of spectra.

Another object of the present invention is to provide an infrared spectrometer of the above character having at least two different scan rates to provide flexibility in spectral response.

Another object of the invention is to provide an infrared spectrometer and monochromator for use therein of the above character having continuous operation utilizing a lineal movement of a single filtering device so that filter substitution and discontinuity in sensitivity during fast scanning is eliminated.

In general, the above objects are achieved in the present invention by providing a double beam infrared source passed through sample and carrier gas cells and recombined in a monochromator which serves to define a very narrow pass continuously variable scan across the infrared spectra such that the output beam of the monochromator can be delivered to a fast response pyro-electric detector. The output of the detector is a direct function of the particular beam information content which is varied in accordance with chopper means for alternatively supplying energy that has passed through the sample cell, through the reference cell or background radiation to the detector. Means is provided for synchronously sampling the detector output during each of the sample signal period the reference gas stream period or background period and for forming a basic ratio which approximates the absorption characteristic of the sample gas as will be hereinafter explained. Such means includes digital gating circuits which are operated by photo cells associated with the chopper means. By providing continuous operation the use of fast chopping frequencies and fast time response detector it is possible to scan the entire infrared absorption spectra of a gas in the sample cell as little as 6 seconds or less or if greater resolution is desired a 30 second scan is provided. Particularly, improvements in the design of monochromator for continuous operation across a wide band of the infrared spectrum.

Particularly improved sample and reference gas cell furnace assembly is disclosed in which the cells are constructed of thermally stable units in which a light pipe having an interiorally reflective wall is mounted in slight compression to obtain sealing forces with the end plates by means having equal substantially coefficient of thermal expansion so that the cell can be mounted in a frame having a bellows-like action to permit expansion of the cell when heated to significant temperatures without inducing thermal strains in the same. The cells (a sample cell and a reference cell of substantially the foregoing construction) are incorporated within a heating furnace manifold having spaced cylindrical sections for receiving the same and an interconnected web to form a symmetrical structure which is symmetrically heated by a heating element attached to the web. The mounting of the cells within the heating manifold is accomplished by use of an exterior housing or cover so that the cells literally float within the heating manifold cylindrical passageways without any contact with them.

These and other objects and features of the invention will be apparent from the accompanying drawings when taken with the following detailed description.

DESCRIPTION OF THE FIGURES

FIG. 2 is a front elevational view of the infrared source and beam splitter assembly A of FIG. 1.

FIG. 3 is a side elevational view taken along the lines 3—3 of FIG. 2.

FIG. 7 is an end view, partially broken away, taken along the lines 7—7 of FIG. 6.

FIG. 8 is a cross-sectional view taken along the lines 8—8 of FIG. 6.

FIG. 9 is a side elevational view, partially broken away, of the monochromator assembly E of the rapid scan identifier of FIG. 1.

FIG. 10 is a top plan view of the monochromator assembly taken along the lines 10—10 of FIG. 9.

FIG. 11 is an end elevational view taken along the lines 11—11 of FIG. 9.

FIG. 12 is a side elevational view, partly broken away, of the detector assembly F of the identifier of FIG. 1.

FIG. 13 is an end elevational view of the detector assembly taken along the lines 13—13 of FIG. 12.

FIG. 14 is a top plan view of the detector assembly taken along the lines 14—14 of FIG. 12.

FIG. 15 is a schematic diagram illustrating the electronic components of the detector of FIG. 12.

DESCRIPTION OF THE PREFERRED EMBODIMENTS

Figure 1:
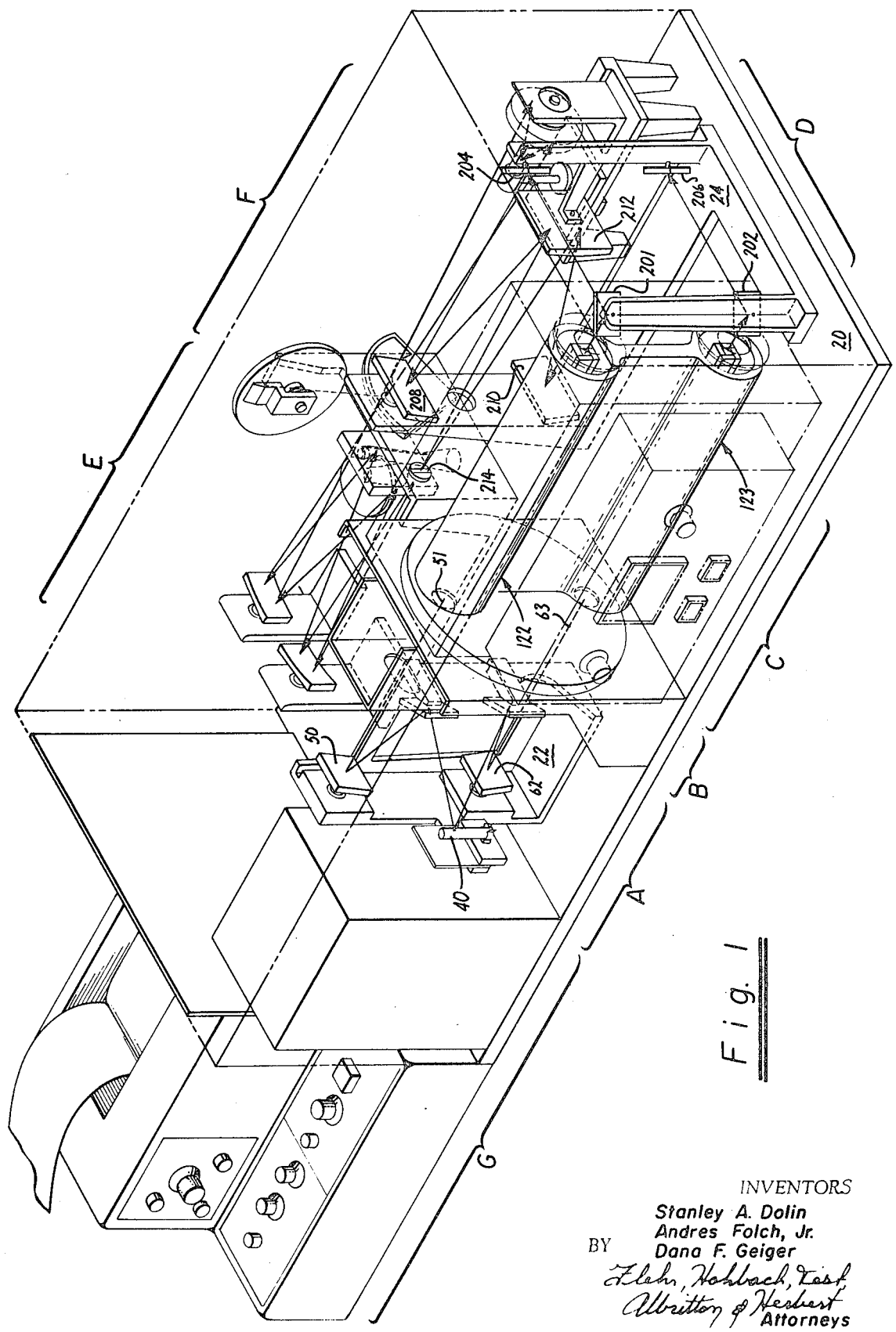
FIG. 1 is an isometric view of a rapid scan identifier constructed in accordance with the present invention and consists generally of an infrared source and beam splitter assembly A, a chopper assembly B, a sample and reference gas cell assembly C, a beam recombiner and transfer optics D, a monochromator assembly E, a detector assembly F, and associated electronic processing circuitry and readout instrumentation G.

Referring to FIG. 1 the identifier of the present invention can most easily be understood as consisting of assemblies which make up substantially the following circuits: (1) a gas absorption cell circuit (sample and reference gas cell assembly C) (2) an infrared optical circuit (source assembly A, transfer optics assembly D, and monochromator assembly E) which creates and recombines two beams of broad infrared energy which pass through the gas absorption circuit and has a scanned output converted by a detector (assembly F) into an electrical signal which is supplied to (3) a signal processing and synchronizing circuit (assembly G) (beam chopper assembly B).

Each of assemblies A and D–F are independently mounted on a substantial heavy flat base plate 20 in such a manner that assembly removal and replacement is facilitated using prealignment procedures. Thus, the base is provided with a set of accurately machined conical recesses for each assembly the depth of each of which is precisely controlled to define an optically flat plane. Each of assemblies A, and D–F is built on subframes 22, 24, 26, and 28 having matching detents for resting on ball bearings cemented into the respective set of recesses in the base plate. By this means each of assemblies A, D–F is vertically removable and may be replaced by a prealigned substitute for interchangeable assembly. This type of construction will be described in detail in connection with the mounting of source assembly A but will be understood to apply to each of the assemblies A, and E–F. With respect to the sample and reference gas cell assembly C the mounting subframe is a plate 30 arranged for precise alignment on runners which permit removal and replacement of assembly C by sliding it forward and away from the instrument without removal of the outer instrument covers, which shroud all sides of the instrument.

In the following description each of the assemblies and components will be described in detail in listed order, after which the operation of the instrument can be set forth in relation to the previous description taken as a whole.

INFRARED SOURCE AND BEAM SPLITTER ASSEMBLY A

Referring to FIGS. 2 and 3 there is shown a broadband infrared source 40 mounted on subframe 22 as by being fastened to an arm 42 thereof in spaced relation on an insulating block 44 and backed with a baffle 46 which extends upwardly behind the source to block radiation from passing rearwardly and aid in forward reflection.

A folded beam divider is provided for creating spaced, generally parallel infrared light beams and includes a plane mirror 48 for reflecting some of the energy from the source upwardly to an adjustable concave mirror 50 which focuses the energy as a beam 51 onto the entrance aperture of a sample gas cell 82 contained within assembly C (FIG. 7). Adjustment of the concave mirror is facilitated by mounting the same onto an orientation ring 52 carried on a spherical bearing mount 54 captured in a jig 56 having adjustment screws 58 which bear upon the rear surface of the ring.

Similarly, a second flat mirror 60 serves to deflect an equal amount of infrared radiation to a concave mirror 62 mounted in the same manner as mirror 50 and adjusted to focus the same as a beam 63 of infrared light energy onto the entrance aperture of a reference gas cell 86 in assembly C.

A detent 70, V-groove 71 and flat 72 are provided on the underside of the subframe 22 for precisely defining the mounting position of the same on one of ball bearings 73a, b, c set in precisely positioned in depth and location in conical recesses 74a, b, c formed in the frame plate 20. V-groove 71 is cut to intersect the detent 70 and rides on the second bearing 73b. The remaining degree of motional freedom is controlled by the flat 72 resting on the remaining bearing 73c. The precisely levelled and positioned bearings with the detent, groove and flat provide for a precise kinematic mounting for each of assemblies A, E and F. The assembly A is retained in position on the bearings (including 73a–c) by a cap screw 76 bearing against a spring 77 interposed between a washer 78 carried under the head of the screw and the bracket fastened to the subframe, the cap screw being threaded into base plate 20. Sufficient clearance is given in the passage of the cap screw through the subframe and bracket 79 that it operates solely to yieldably urge the subframe into contact with the plate without influencing its lateral or vertical position as it rests upon the precision, levelled bearings.

Each of assemblies A, D–F are mounted in the same manner so that, by aligning each assembly in one spectrometer unit of the present invention, the same will be prealigned for precision interchangeable assembly in any other unit.

BEAM CHOPPER ASSEMBLY B

Figure 4:
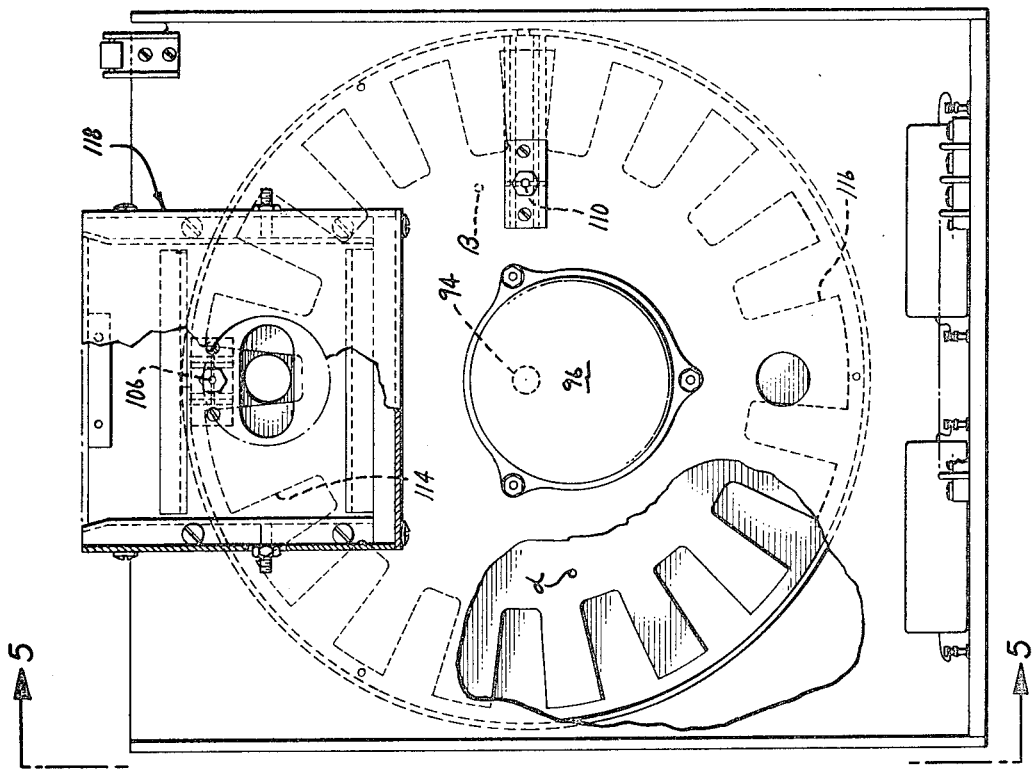
FIG. 4 is an elevational view of a chopper assembly B of FIG. 1 as seen from the assembly of FIG. 2.
Figure 5:
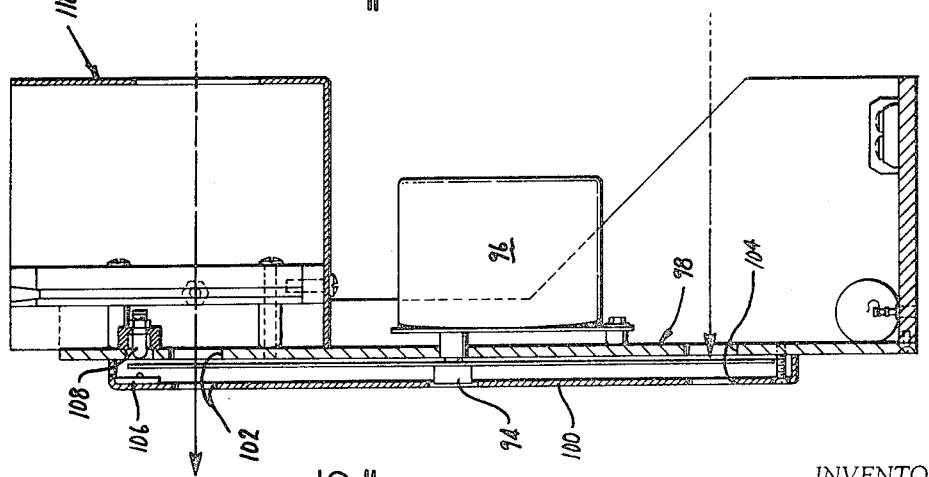
FIG. 5 is a side elevational view taken along the lines 5—5 of FIG. 4.

Referring now to FIGS. 4 and 5 there is shown means for alternately chopping the sample beam and the reference beam and consists of a circular disc having peripheral blades formed by a plurality of notches along its periphery. The blade is mounted on the shaft 94 of a synchronous motor 96 carried in the vertically upstanding supporting frame 98 directly secured to plate 20. A cover 100 is attached to one face of the support plate and over the chopper disc, each of the support plate and cover being provided with aligned sample and reference beam passageways 102 and 104 respectively (FIG. 5).

Means are provided for developing an electrical signal whenever the sample beam is permitted to pass and consists of a photocell circuit including a photodiode 106 mounted on the inside of the cover 100 and exposed to a small light source 108 such arranged on the adjacent portion of the frame 98 directly above the sample beam aperture 102, such that the movement of the disc blades traverses both the sample aperture 102 and the photocell light path to cause conduction of the photodiode whenever the sample beam aperture is opened by the passing of a respective notch.

A second photocell circuit is provided and consists of a photodiode 110 mounted on the cover at a position remote from sample and reference beam paths to provide light isolation and a second light source 112 (not shown) is provided opposite this second photodiode. A pair of diametrically spaced apertures $\alpha,\beta$ are formed in the disc at the same radial distance from the axis of rotation as the second photodiode 110. Whenever these apertures pass the light path between light source 112 and photodiode 110 they cause conduction of the photodiode 110 to signify the upcoming of a blank period in which both sample and reference beams are blocked.

As shown in FIG. 4 the blades are formed by radial cuts of the periphery of the disc along radial suit through center of rotation. All notches are approximately of equal width and depth. A pair of nearly opposite blades 114, 116 are of double width to provide blanking of both sample and reference beams to permit measurement of background radiation. There are odd number of such notches which results from combining the requirements that the sample and reference beams be alternatively passed and that there be some position in which both are blocked. As is evident from an examination of FIG. 4 rotation of the disc alternately sends light apertures until the position arrives which is approximately shown in the diagram for which there are corresponding blanks in each side of the disc. At that point of the rotation of the disc, neither of beams 51, 63 is passed and the second photodiode 110 is energized by the passage of one of the small holes $\alpha$ or $\beta$ to indicate the upcoming blank during which background radiation is measured. Signals from the photodiodes serve to synchronize pulses and are passed to associated electronic processing circuitry to be hereinafter described.

Means are also provided in connection with chopper assembly for holding a calibration sample and consists generally of a box-like structure 118 fastened above and immediately in front of the sample aperture 102. As will become later evident such a provision permits the insertion of liquid and solid samples for rapidly taking of their spectra.

SAMPLE AND REFERENCE GAS CELL AND FURNACE ASSEMBLY C

The furnace assembly consists generally of a base plate 120 on the upper side of which is mounted a two chamber heating furnace 121 consisting generally of a binocular-like structure having spaced parallel hollow cylindrical sections 122, 123 therethrough interconnected by a solid web 124 as by being formed in an integral casting of thermally conductive material such as aluminum an electrical resistant heating element is mounted onto the web and is controlled by a suitable thermocouple connected through a thermistor probe 125. Internal temperature within the furnace is indicated by dial readout 126 on the front plate and the temperature setting is controlled by a suitable dial operated thermostat 127. Control power is provided through suitable indicator switches 128, 129 which indicate when power is available and when it is being utilized. The furnace is mounted in upstanding position by the use of a plurality of thermal insulating support members 130 by which the element is maintained in spaced relation to the base plate and generally is otherwise unsupported within the structure. The foregoing casting serves as a heat manifold such that heat supplied by the electrical heating element travels through the web and due to the symmetrical structure of the device is generally equally distributed into each of the cylindrical sections.

A sample cell 132 is mounted within the upper tubular section of the manifold and a reference cell 134 is mounted within the lower tubular section.

Each cell is constructed of an integral and unitary manner structurally independent of the furnace manifold and in general is not anywhere in direct contact with the manifold. Thus, suitable coverplates are provided enclosing the entire structure of the furnace unit, and these plates serve to mount the sample and reference gas cells. Each of the light cells is identically constructed so that the following description will be taken with reference to all of the features shown in the drawings, like parts for each cell being given like numbers. Referring particularly to FIG. 8, as the basic unit of the cell, consists of a tubular member forming a light pipe comprising a glass structure made up of four symmetrically disposed identical elements 135–138 of optical quality. One end of each of the elements abuts the side of the next adjacent element to form a closed structure having a square aperture passing therethrough. The inside surfaces 139$a$, $b$, $c$, $d$ of each of the walls are coated with a suitable reflective coating for use in the infrared spectrum. Preferably the reflective coatings are gold and provided by vacuum deposition with a 1/20th wavelength of silicon monoxide coating thereon to facilitate protection of the gold and also to reduce adhesion of any material passing through the cell. The interfaces between portions 140$a$–$d$ of the face and side walls which make contact between each adjacent sections 135–138 are rough-ground to prevent capillary travel of glue to interior surfaces. The structure is assembled in a suitable jig as shown and a glueline is run down each of the beveled troughs 141$a$–$d$ in the outer edges to bond the structure into a gas tight cell. The glue used for this purpose must have no porosity and be chemically inert to all organic materials as well as possess high strength up to significant temperatures to the order of 250°C. Certain ceramic glues have these properties as well as some of the epoxy glues. Examples include Ceramaseal and Tracor 2278 epoxy cement.

After assembly each sample cell is assembled into a unitary structure together with the end fittings to form a closed chamber. In the following discussion it will be helpful to refer to the broken away portion of the assembly as shown in the lower right hand side of FIG. 6 in which cross-sectional views of the cell end structure are shown as seen along reference lines 6–1A and 6–1B of FIG. 7, which multiple cross-sections are also indicated by brackets on FIG. 6. Thus, as shown particularly in FIGS. 6 and 7 an end plate 142 is provided each having a recess therein facing toward the tubular member and an annular recess provided therein holding an O-ring 143 for obtaining a sealing arrangement with a member. An aperture 144 is provided for admitting light in and out of the cell. The opposite end of the sample cell structure is likewise provided with a similar end plate 145 each end plate extending laterally a sufficient distance to permit their interconnection exteriorily of the light passageway in the cell.

Tensioning means are provided for interconnecting said end plates and for placing sealing compression on said light pipe and consists of a symmetrical three-point tensioning support consisting of three rods 146$a$–$c$ each having shoulders 147 formed at their ends for abutting the respective end plate to which it is held by screws 148. The distance between shoulders is made slightly less than the length of the light pipe and O-ring seal to provide proper tension-compression connection. The materials of which this structure is made are of considerable importance and critical since inadequate support of the light pipe or overtight support will cause leaks or breakage of the system. And, it is required that the cell be capable of being heated to very substantial temperatures without the consequent thermal expansion causing either loss of seal or undue strain in the device. Accordingly, the supporting rods are selected of a material which has a coefficient of expansion nearly identical to that of the glass elements of the pipe so that when the structure is assembled it expands thermally in a uniform manner without strain or loss of seal. The selected optical quality plate glass used in one form of the present invention had a thermal expansion found to be $9 \times 10^{-6}$ parts per degree centigrade. For such glass it is possible to use nickel-steel rodding having a coefficient of from about $8-10 \times 10^{-6}$ parts per degree centigrade.

The end of each cell is closed by a salt window 149 mounted against an O-ring seal 150 provided in the end plate and held in position by window holder 151 consisting essentially of an annular disc having a recess for holding the window and fastened to the respective end plate by screws 152. Each cell assembly is thus formed into a unitary construction which is arranged to float within the tubular passages of the furnace manifold. Support for the sample and reference cells is provided by a set of flanges 153 coupled to the unit through thermally insulating spacers 154 and screwed through the housing covers 156 of the furnace assembly. The housing covers are sufficiently flexible that they serve as a bellows and yield easily to the expansion of the sample and reference cell assemblies while maintaining the orientation of the sample and reference cells in a floating position (out of physical contact) within the furnace walls. Suitable light admitting apertures 157, 158 are provided in both the window holder and the support flange.

Each of the end plates is provided with a suitable access hole connected to inlet tubing 161, 162 and outlet tubing (not shown). Inlet tubing 162 connects to a fitting for supplying a carrier gas stream to the reference cell as shown.

Referring to FIG. 7 the input of the sample cell is connected through a valve 163 to the output of a gas chromatograph through tubing. The valve is of a simple construction consisting of a body 164 having a shaft 165 therein containing a bore which may be oriented to close or open the valve similar to the action of a stopcock. Stops are provided together with spring biasing means 169 for urging the stem and shaft 165 into a seated relationship within the valve body and consists of shoulder screws 167, 168 and springs 169 resting between the respective shoulder screw and the stem flange 170 under slight compression. The valve permits operation of the device in either flo-through mode or by trapping a gas sample. The outlet ends of the sample and reference cells are connected through suitable piping not shown and are vented to the atmosphere.

Figure 6:
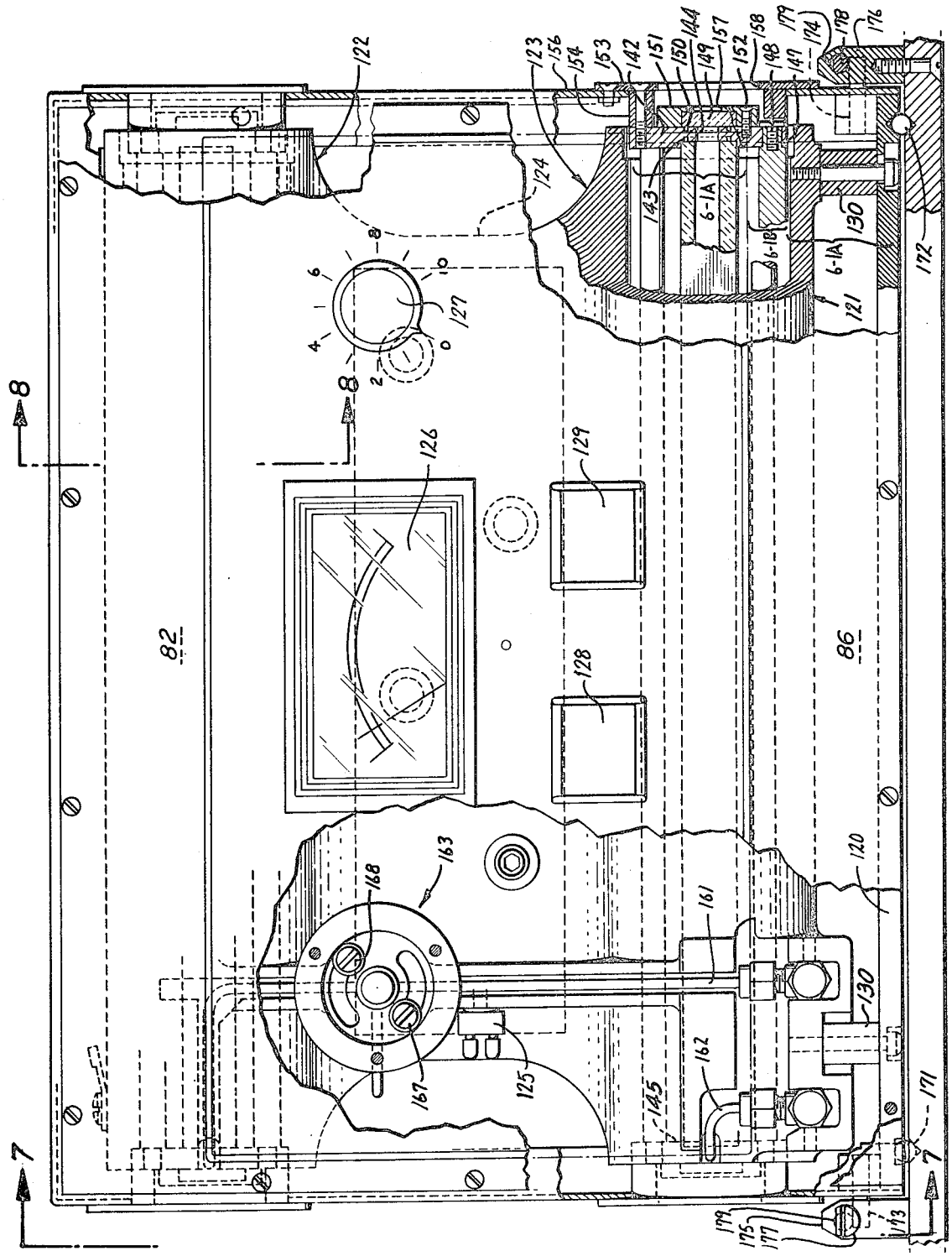
FIG. 6 is a side elevational view, partly broken away, of a sample and reference cell assembly C of FIG. 1.

As shown particularly in FIG. 6 the entire gas cell and furnace assembly is mounted for sliding movement on rods 171 and 172 embedded in the base plate 20 of the instrument. Right hand rod 172 is adapted to support a corresponding V-shaped groove cut into the base plate of the furnace assembly, while the left hand rod 171 is adapted to support the other end of the assembly in a channel having a flat which will permit expansion of the device as a whole from heating without changing its optical alignment. Each of the rods provides for control of accurate vertical positioning of the furnace assembly. Lateral positioning is provided by pegs 173, 174 mounted through the right and left ends of the assembly which abut respective one of a pair of blocks 175, 176 provided on base plate 20. The pegs are retained in position by screws 177, 178 having a head which is provided with a flat 179 on one side so relieved as to permit the peg to pass when the flat of the head is aligned with the peg. After the unit is slid backward into position within the instrument the screw is rotated a half turn to accurately lock the unit into position.

BEAM RECOMBINING ASSEMBLY D

Referring again to FIG. 1 there is shown the beam recombining and transferring optics assembly D consisting of an L-shaped base plate 24 having means for mounting first pair of turning mirrors 201, 202 mounted to receive the output of the respective sample and reference cell, a second set of turning mirrors 204, 206 mounted to transfer the light output toward recombining optics consisting of spaced concave spherical focusing mirrors 208, 210 directing the beams toward a double (flat) mirror 212 which redirects the converging beams to an adjustable slit 214 shown in detail in FIGS. 9-11, on the monochromator assembly E. Each of the foregoing mirrors is mounted in a predetermined, prealigned position upon the subframe which in turn is fastened to the face plate 20 and rests thereon on precision positioned bearings as previously described herein. A groove (not shown) is provided along the base for resting on bearings aligned, both being aligned with the monochromator slit, while the third bearing supports a flat adjacent the furnace assembly output. This permits the entire assembly D to be moved toward or away from the slit with consequent focusing adjustment.

MONOCHROMATOR ASSEMBLY E

Referring now to FIGS. 9-11 there is shown the monochromator and assembly which serves to define and restrict the output of beam to that narrow portion of the spectrum which is of interest. In general the monochromator includes a ruled grating 220 to provide spectral dispersion of the infrared spectrum which is operated in the first order and the output of which is passed through a circular variable filter 222 for cutting off higher order modes of the grating. Means will be described for synchronously varying the position and consequent frequency output of the grating together with adjustment of the slit width and the circular variable filter. The assembly is mounted upon the subframe 20 having legs with means for providing a kinematic mounting upon bearings accurately set into base plate 20 and for being retained thereon with spring biased screw similar to that shown in FIG. 2 in connection with the source assembly. One end of the base plate is provided with upstanding arms for adjustably mounting mirrors, 224, 226 and for directing light received from the variable slit 214 to the grating 220 and for redirecting the reflective and dispersed light of the first order from the grating through the circular optical filter along paths 228, 229, 230, 231, respectively.

The grating is mounted on an arm 232 pivoted at 233 and urged by spring 234 into engagement into the surface of a cam MC-1 set in bearings 236 for rotation in a horizontal plane and having a shaft 237 which extends below the framework and is coupled to a bevel gear 238. A horizontal drive shaft 240 extends horizontally below the surface of the support frame in bearings and carries thereon second, third and fourth cams, MC-2, MC-3, MC-4 respectively and fifth cam MC-5, the purposes of which will be now explained. The drive shaft is driven by a nonslip positive drive flexible belt 243 which passes about the drive pulley 244 of a motor 245 mounted beneath the framework and also passes upwardly to drive a pulley 246 mounted on a shaft 247 carrying a cam MC-6 and spring loaded follower 247 the purpose of which is to compensate for variations in loading of the motor as it sends the remaining cams through a cycle. Since the pulley drive is non-slip the position of a dial wheel 250 on shaft 247 can also be used to indicate the position of both grating 220 and filter 222 to provide visual readout and for adjustment of a particular frequency of operation of the monochromator.

The adjustable slit of the present invention as seen particularly in FIGS. 10 and 11 consists of a pair of spaced blades 252, 253 set in holders. Each of the blades 252, 253 is mounted on slide bars 254, 255 adapted for linear motion back and forth on shoulder screws 256 and 257. (FIG. 10) The outer slide bar 254 is connected at one end to a pivot point on a follower arm 254a resting against driven cam MC-2 so that arm and blade is carried between an open and closed position in accordance with the cam cut. The inside bar is spring urged into a closed position by spring 258 connected between the bar and the frame. A wire rope 259 is reeved about pulley 260 and serves to connect the inner and outer bars. In this way movement of the outer bar towards an open position to the right is accompanied with a corresponding movement of an inner bar to the left and thus provides for cooperative opening and closing of the slit width symmetrically about the mid point of aperture 214.

Horizontal shaft 240 also carries a cam MC-3 against which a follower 270 contacts, the follower being connected to a gear 271 at its pivot point which engages a reduction gear 272 mounted for rotary motion in fixed relation on the sector of the circular variable filter 222.

The circular variable filter 222 is of a type which is commercially available from Optical Coating Laboratory, Inc., Santa Rosa, California and is of the cut-on type, and is a long-pass filter which has a variable cut-on frequency such that it transmits long wavelengths and rejects the short wavelength frequencies. The cut-on wavelength is variable as a function of lineal distance along the circular arc of the filter. The remaining cams MC-4 and MC-5 serve to operate switch means as will be hereinafter discussed.

DETECTOR ASSEMBLY F

The output beam 278 of the circular variable filter is collected by a suitable concave mirror 280 and focused on the input of a pyro-electric detector 281 mounted together with its preamplifier on a subframe 28 having legs with suitable kinematic mounting means for accurate positioning of the same on base plate 20. A screw is provided together with spring urging means for providing clamping pressure to hold the subframe in position. FIG. 15 shows the electrical character of the detector which uses an active element of a thin slab of ferroelectric crystal 283 exhibiting a spontaneous electric charge concentration that is temperature dependent. The crystal is positioned between electrodes of a capacitor 284 to develop a voltage proportional to incoming radiation over a wide bandwidth. The field effect transistor amplifier 285 is incorporated to reduce the effective output impedance, the outputs being sent to a preamplifier 286 for raising the gain as a function of frequency at about 6db per octave and maintains a flat frequency response as a function of chopper frequency.

ELECTRONIC CONTROL CIRCUITRY G

Figure 16:
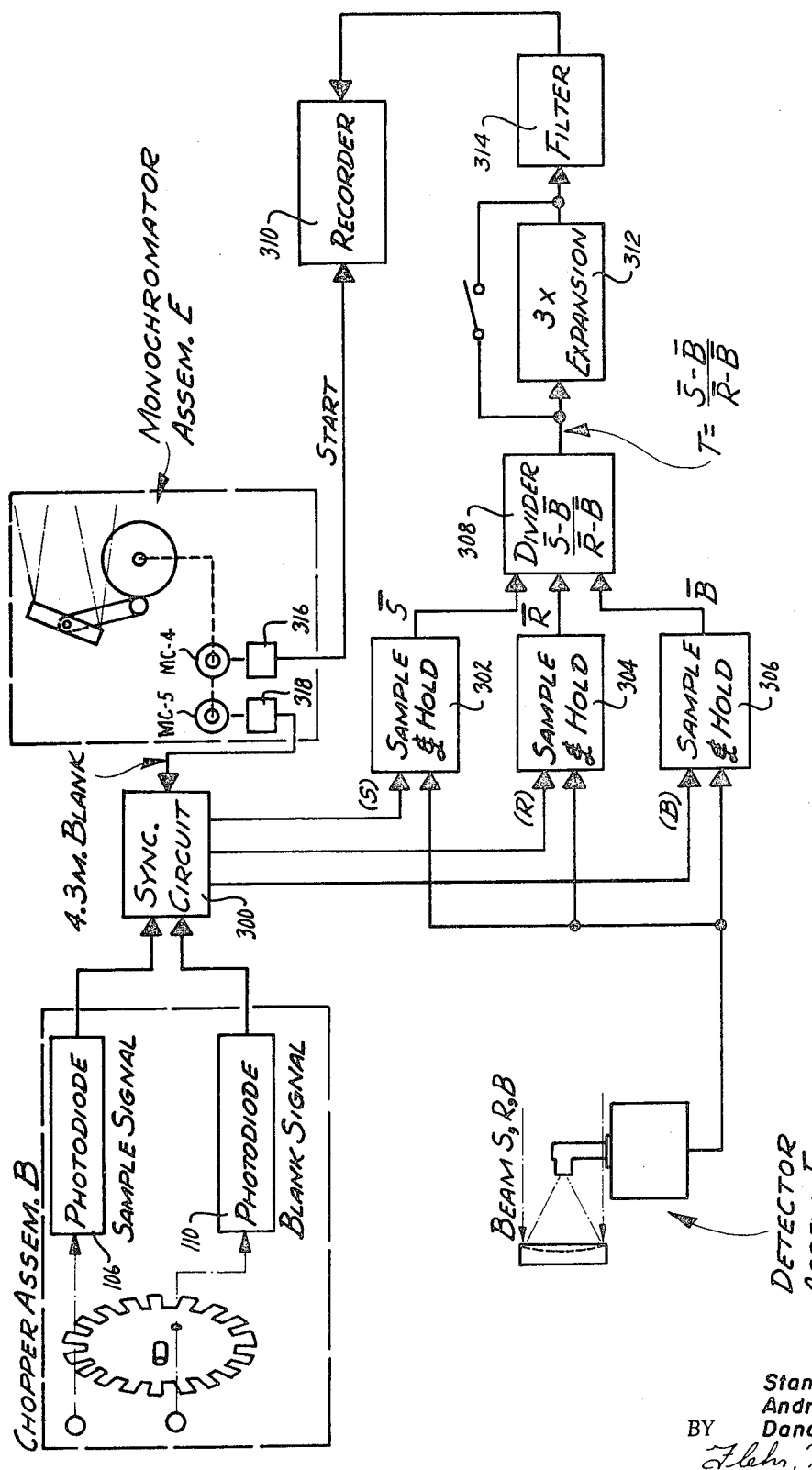
FIG. 16 is a schematic diagram showing the electronic control and signal processing circuitry G of the instrument of FIG. 1 together with related elements from the chopper assembly B, monochromator assembly E, and detector assembly F.

Referring now to FIG. 16 there is shown in schematic form the electronic processing circuitry G of the identifier of the present invention together with certain detail relating the elements of chopper assembly B monochromater assembly E and detector assembly F. As has been developed so far it is known that the detector receives a beam from the monochromater assembly, which at any instant of time is either the beam $S$ passed through the sample cell, the beam $R$ that is passed through the reference cell or the background $B$. Whenever the sample beam S is being passed to the detector a sample gate signal is generated by the light passing to signal photodiode 106 in the chopper assembly. Conversely, whenever the sample gate signal is absent, that is to say during periods when no signal is received from the signal photodiode 106 the reference beam is present at the detector. Twice during each revolution of the chopper blade a blank signal is generated by photodiode 110 which coincides with the double width blades on the chopper wheel which serve to cut off both the sample and reference cell light beams and therefore provide an indication of the background illumination. These signal pulses are provided to a synchronizing circuit 300 which develops accurately timed sample signal gate pulse ($S$), a reference gate pulse ($R$) and a background gate pulse ($B$). Each of these pulses is applied to one input of a respective sample and hold circuit 302, 304, 306, the other inputs of which is constantly supplied with the output of the detector assembly $S+B$, $R+B$, $B$. Thus sample and hold circuit 302 has applied to its input S, R, B, detected signals but because of the timing of the sample signal gate its output consists solely of a signal proportional to the sample absorption $\bar{S}$. Likewise, sample and hold circuit 304 has an output $\bar{R}$ the reference signal taken at the time dictated by the reference signal gate applied to its second input. And, the background signal $\bar{B}$ is developed by sampling at the time dictated by the synchronizing circuit output of background gate signal ($B$) in sample and hold circuits 306. Each of these signals is clamped at the last sampling value and applied to a divider circuit 308 which may be simple analog computer for performing the function $\bar{T} = (\bar{S} - \bar{B})/(\bar{R} - \bar{B})$ the output of which is applied to the recorder 310 through an expander 312 and filter 314 as may be desired. The recorder is synchronized with the monochromator by a switch 316 driven by cam start $MC-4$ on the horizontal shaft so that the recorder trace begins and ends in accordance with the monochromater movement.

In order to eliminate the ambiguities caused by the reference and sample signals essentially vanishing during that portion of the spectrum at 4.3 microns, (caused nearly total absoprtion of signal reference beams by atmospheric carbon dioxide) there is also provided a blanking pulse delivered through a suitable switch 318 adapted to be actuated by cam MC–5 of the monochromater. The 4.3 blanking pulse is applied to the synchronizing circuit and serves to disable the circuit so that no sample, reference, or background gating signals are delivered during the 4.3 blank period.

Figure 17:
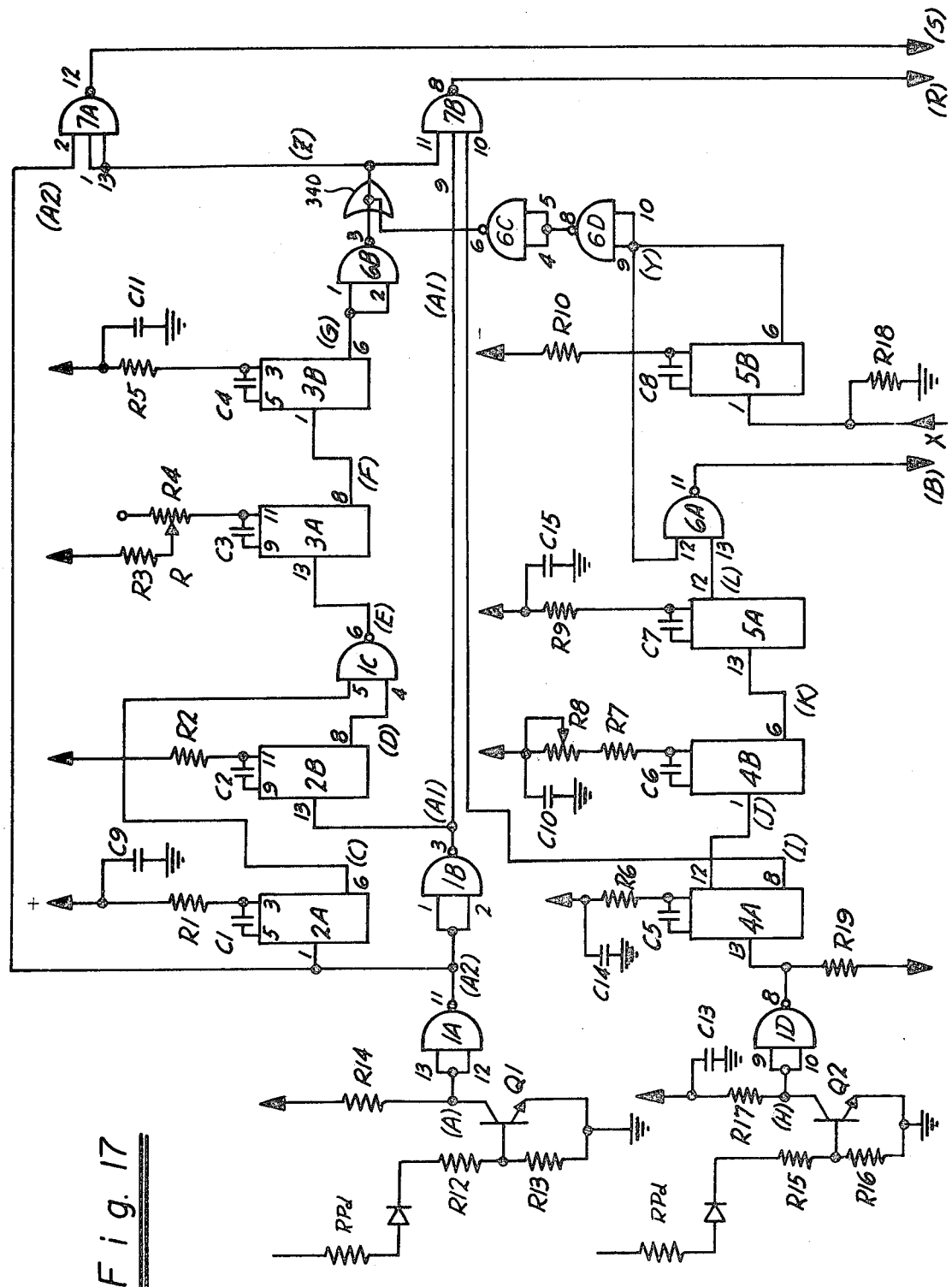
FIG. 17 is a detailed schematic drawing of the circuitry of FIG. 16.
Figure 18:
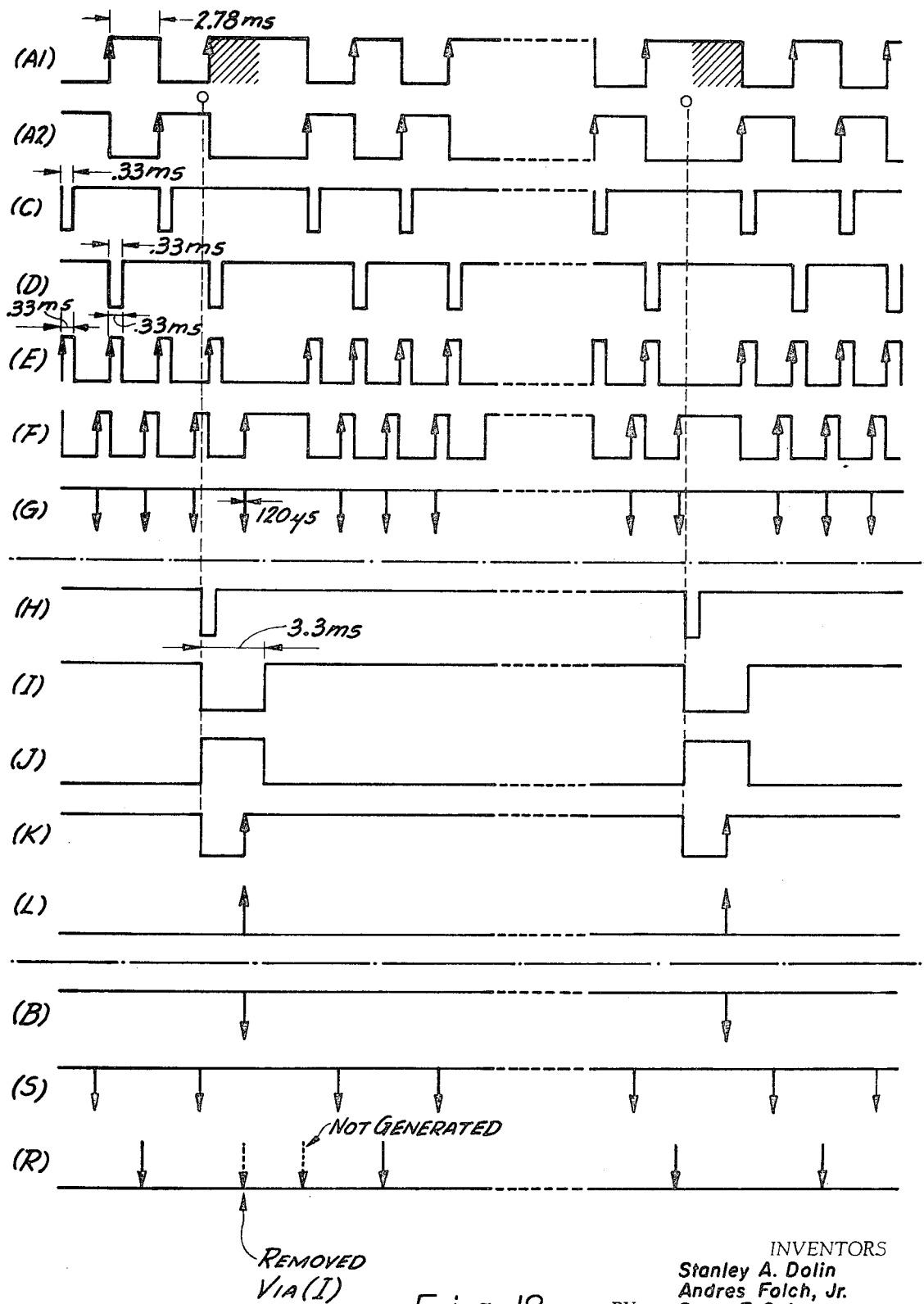
FIGS. 18 (A1), (A2), (C)–(L) and (B), (S), and (R) are timing diagrams relating the electrical signals developed in the synchronizing and control circuitry of FIG. 17.

Referring now to FIGS. 17 and 18 there is shown a detailed diagram of a synchronizing circuit of the present invention. The synchronizing circuit has three inputs, the first being from the output of photodiode 106 in a path adjacent the sample aperture in the chopper assembly. Whenever this photodiode is energized it is indicative of the opening of the aperture. As previously mentioned whenever the signal is not present it is indicative of the reference cell.

Referring now in detail to FIGS. 16 and 17 there is shown a detailed schematic drawing of the synchronizing circuitry of FIG. 15 and the associated timing pulses. It is the objective of this circuit to supply a relatively short sampling pulse which occurs at a predetermined timed position within the period in which the blade is either a position for passing light through the sample cell positioned for receiving light through the reference cell or at a position blanking off both cells so that a background count can be obtained. Thus, means is provided for generating sample gate pulses and consists generally of photodiode output amplifier including transistor Q1 and resistances RPd, R12, R13 and R14. The output of amplifier is passed to a NAND gate 1A connected to serve as an inverter so that the resultant signal (A2) becomes a real picture of the blade and is applied to one input of a three input NAND gate 7A, to define the time interval during which the light beam is passing through the sample cell. The sample gate pulse generating circuit also includes pulse forming network consisting of IC monostable multivibrators and inverting NAND gates 2A, 2B, 1C, 3A, 3B and 6B to be hereinafter described in greater detail.

Means are provided for generating reference gate pulses and consists of inverting NAND gate 1B the output of which is applied to one input of a three input NAND gate 7B. Each of NAND gates 7A and 7B are connected to the output of the pulse forming network through a wired OR connection 340. In general, the inverting NAND gates 1A and 1B serve as a logic interface from the photodiodes circuit to the logic circuitry and avoid compatibility problems.

The pulse forming section consists of a first stage 2A consisting of a monostable multivibrator for generating pulses (C) at the incidence of each sample signal. Similarly, monostable multivibrator 2B generates pulses on the leading edge of each of the inverted input signals corresponding to the reference beam. Output signals (C) and (D) are applied to the input of a delay circuit 3A by being combined in a NAND inverter 1C. The output signal (F) from 3A is so arranged that the multivibrator is turned off on the leading edge of each of signals (E), the recovery time being set by the combination of resistances R4, R3, and C3. The recovery pulse is sensed by the input to multivibrator 3B to form pulses (G) delayed a predetermined time within the sample and reference pulse. Pulses (G) are supplied through an inverter and the wired OR to the inputs of NAND gates 7A and 7B. Thus, during each sample interval a pulse having a predetermined delay from the beginning of the interval is generated by the combination of (B), (G) and is indicated as an output (S) of the device in FIG. 17. Likewise, during the interval of the reference cell operation the signal (A) (G) is combined to produce an (R) sampling signal delayed within the reference. The (R) and (S) signals are applied to the sample and hold circuits 302 and 304 as will be herein described.

A background gating network is also provided and consists of a photodiode amplifier Q2 and associated resistances R15, 16 and 17 and capacitance C13. The output of Q2 is supplied to a NAND gate connected as an inverter which serves as an interface to the subsequent logic circuitry. The wave form (H) is merely the inverse of the output of the blank photodiode 110 and is supplied to one input of monostable multivibrator 4A which serves to generate a defeat signal (I) which is applied to pin 10 of reference NAND gate 7B, to disable that gate for the interval during which background count is taken. For counterclockwise sense of rotation of the blade of the chopper blade as seen in FIG. 4 it will be observed that the only interferring of the signal which could appear during the period of the taking of the background is the reference cell pulse due to the character of the blade. Accordingly, it is not necessary to blank out the signal pulse, since the same is not generated during the pertinent period.

Further means is provided for further developing a control gate pulse (B) and consists of multivibrator 4B which receives the inverse signal of (I), labeled (J) and multivibrator 4B is turned off by the leading edge of signal (J) for a predetermined time, depending upon the adjustment and values of resistance R7 and R8 capacitances C6 and C10 after which the multivibrator returns to quiescent condition the leading edge of which is sensed to form Signal L and is sensed by inverting NAND gate 6A and the output of which is the background gate pulse (B).

An additional circuit is provided for disabling all circuits forming the sample gate control pulses (B), (S) and (R), as monochromator scans through the 4.3 micron absorption line of carbon dioxide. The circuitry consists of a monostable multivibrator 5B the output of which is connected through inverters 6A, 6B, 6C, 6D to both one input of NAND gate 6A and to the wired OR 340. Whenever a signal X is present on multivibrator 5B, the wired OR and NAND gate 6A are turned off to thereby disable and defeat any further sampling during that portion of the scan and this way the divider network is not given the problem of dividing 0 into 0 during the scan which would otherwise cause an instability in the scan digital readout at that point.

It will be noted that the discussion of the blanking circuit and diagrams relate to a symmetrically disposed blanking caused by the necessity of distributing a symmetric blank in an otherwise unsymmetric pattern. The blank photodiode and associated holes and, B produce differences therefore in the position in which the blank pulse is needed and useful, such difference being caused by the asymmetric nature of the blade. Accordingly, a second timing diagram B is given which relates the blank pulse caused by Hole B with the timing diagram as a whole. The timing signals C through (g) remain the same and need not be repeated. However, the signals H through L occur in a different time relationship and are shown in revised form in connection with the signal being generated in the associated part of the blade passing the sample photodiode corresponding to the B blank signal.

SUMMARY OF OPERATION OF THE SPECTROMETER

Much of the operation of the present device has been discussed generally in connection with FIG. 1 and specifically in connection with each of the Figures. However, it may be helpful to review some of the operational features and advantages of the invention. Referring generally with reference to FIG. 1 the radiant infrared energy from the source is formed into two beams 51 and 63 which are passed through the sample and reference cells respectively when redirected through corner mirrors 200, 202, 204 to 206 to focusing mirrors 208, 210 redirecting optic double flat mirror 212 to be focused into the monochromator slit 214. Focus adjustment is provided by positioning of the subframe 24 in a line perpendicular to the slit of slit 214 mirrors 210 and 212. The beam defined at the aperture is constantly being changed between that of the reference beam 63 and sample beam 51 as well as an occassional blank which serves to permit measurement of background effects. The monochromater operates substantially as hereinbefore described to provide a narrow pass band which is continuously and rapidly shiftable across the infrared spectrum and results in an input beam which is fed to a broad band detector having fast time response and excellent signal to noise. The output of the detector is sampled in accordance with the timing diagram of FIG. 18 and supplied to the chart recorder.

The sample and reference gas cells are believed to be of highly novel construction utilizing selected optical quality plate glass which can be scribed and snapped off into elongate pieces, mechanically roughened along adjoining surfaces and beveled and subsequently vacuum deposited with gold reflective coating together with protective coating of silicone monoxide. The silicone monoxide coating is found to assure that amazingly little sample gas molecules adhere to the coating during the passing through the cell and of course supply some protection to the gold reflectivity. By matching the coefficient of expansion of the supporting structure of the cell together with the glass member of which it is made and by floating the same in the heating manifold a very stable and effective gas cell is obtained. The monochromator of the present invention is capable of providing a practically constant wave number and constant resolution output over the wide dynamic range. As so constructed most of the variables that plague infrared spectro analysis have been compensated out by this instrument and it is now possible to obtain rapid scan identification of infrared spectrum within moments. This is particularly important where the vaporization of sample gases into carrier stream may involve sample retention times within the instrument of the order of seconds so that additional time for study is not available. Further, the instrument will permit the study of progressive chemical reactions which occur within the resolution times provided.

Thus, by controlling the resolution of the instrument at the speed of scanning together with the sensitivity in the present instrument together with an inherently fast detector the possibility of collecting and processing infrared scanning data quickly with high optical efficiency, low losses in the sample and reference cells, so that a state of the art instrument has been provided.

This instrument operates on the basis that the transmission or absorption characteristic, $T$, of the sample can be expressed as a ratio $T=S/R$; however, background, $B$, is superimposed upon each of these signals so that the actual output including background $T=(S+B)/(R+B)$. Elementary analysis will show that the function $T=(S-B)/(R-B)$ is a satisfactory approximation to the real value of $T$ under normal circumstances.

While the specific contours of cams MC-1 – MC-6 have been shown in only minor detail it should be realized that their curvature optimizes linearity of this specific instrument and that such curves will vary with any modification or improvement of the present invention.

Accordingly it should be understood that the description and details analysis presented in the present application is to be understood as illustrative of a preferred embodiment of the present invention and is not to be taken as a limitation thereon.

We claim:

1. In a rapid scanning infrared spectrometer for analyzing the output of a gas chromatograph in which samples are vaporized into a carrier gas stream and separated into fractions by said gas chromatograph, an elongated light reflecting tube sealed at each end thereof, means connected to said tube for supplying the gas output of said chromatograph to said tube, means for heating said tube to a temperature above the condensation point of the material vaporized in said stream, a second elongated light reflecting tube sealed at each end and identical in construction to said first tube, means for delivering a carrier gas stream to said second elongated tube, means for symmetrically mounting and heating said tubes in a furnace, an infrared source, means for dividing a portion of the output of said source into separate beams and for focusing said beams into an input end of each of said light tubes, a monochromator for receiving the output of said sample and reference gas cells and for selecting and transmitting a narrow band selected portion of the infrared energy band, means for receiving the light beam emitted from the other end of each of said tubes and for recombining said beams into a single beam and focusing the same upon the input of said monochromator, a detector for receiving the output of said monochromator said detector having a broad bandwidth and a rapid response and generating an output to thereby generate output signals in electrical output signals proportional to the strength of energy falling upon said detector, chopper means including a blade mounted in the paths of said sample and reference beams before the same pass through said light tubes said blade being constructed to have portions for selectively and alternately blocking either the sample light path or the reference light path and further having portions for blocking both light paths and thereby permit the detector to generate signals $S+B$, $R+B$ and $B$ corresponding respectively to reception of light energy $S+B$ passed through the sample cell, of light energy $R+B$ passed through the reference cell or of background light energy B which is residual to each cell so that said sample and reference beams are chopped at a predetermined frequency to give an alternating signal while said background signal is not chopped, means for developing electric signals corresponding to the physical movement of said chopper means for defining sampling pulses, $(R)$, $(B)$ coincident with a predetermined interval during which corresponding one of said detected signals, $R$, $B$ is present at said detector, means responsive to said sampling pulses for sampling the $S$, $R$, $B$ signals during the coincidence of the respective pulse and for holding the last value obtained to develop signals, $\bar{R}$, and $\bar{B}$ which represent the value of the signals $S$, $R$, and $B$ during the intervals $(S)$, $(R)$ and $(B)$ respectively, means for computing an approximation to the ratio $S/R$ compensated for the background signal $\bar{B}$.

2. A rapid scan spectrometer as in claim 1 in which said monochromator includes a grating, means for selectively transferring the selected portion of the first order spectrum of said grating, a circular variable long pass filter having a cut-on frequency lying between said first and second order outputs of said grating for passing long wavelengths and rejecting short wavelengths received from said grating and having a characteristic such that said cut-on frequency continuously varies as a function of a lineal distance along said filter, means mounting said filter and said grating and ganging together for synchronous movement whereby said cut-on frequency is shifted so to remain between said first and second orders of the grating as the grating operates to scan the infrared spectrum and to define a narrow bandpass output beam from said monochromator.

3. Apparatus as in claim 2 in which said means for mounting said grating and said circular variable filter are operative over a period of less than 10 seconds.

4. Apparatus as in claim 2 in which said driving means operate said grating and filter over a period of about 30 seconds.

5. A spectrometer as in claim 1 in which each of said source optics, monochromator and detector are arranged on independent subframes as integral assemblies, and in which a base plate serves as a frame for mounting each of said subframes for interchangeable assembly.

6. A spectrometer as in claim 5 in which said frame plate is provided with a plurality of recesses having depths precisely developed with respect to each other in accordance with the accuracy of the bed of a machine for forming the same whereby said frame plate may be non-flat precision bearing disposed in each of said frame recesses, means formed in each assembly subframe and corresponding to lateral positioning of said bearings to form a kinematic mounting therefore, means for yieldably urging each subframe into positional contact on its respective bearings to precisely support the same.

7. An infrared spectrometer as in claim 6 in which the associated optical elements on each subframe are prealigned for precise interchangeable assembly.

8. An infrared spectrometer as in claim 1 in which said chopper means is a disc mounted such that one portion is in the sample beam light path and another portion is in the reference beam light path, means for rotating said disc, said disc having blades thereon arranged to alternately pass either the sample light beam or the reference light beam, and further having portions for blocking both beams to thereby generate said S, R and B signals at said detector.

9. An infrared spectrometer as in claim 8 in which said means for developing electrical signals corresponding to physical movement of chopper includes a first photocell circuit for sensing the position of said disc while one of said sample or reference beams is passed.

10. An infrared spectrometer as in claim 8 in which said means for developing electrical signal corresponding to chopper position during blanking of both sample and reference beams includes second photocell circuit, apertures carried on said disc and aligned for passing light to indicate when said beams are to be blanked.

11. A spectrometer as in claim 1 in which said furnaces consists of and including assembly, a framework including a base, a furnace element, said a furnace element made of thermally conductive material insulator support means for mounting said furnace element in upstanding relation on said base, said furnace element being integral casting having spaced hollow cylindrical sections forming passageways therethrough a web interconnecting said cylindrical sections to form a symmetric structure, a heater symmetrically mounted on side of said web, a sample cell disposed on one tubular section, a reference cell disposed in the other tubular section, means interconnecting an input of said sample cell through a source to the output of a gas chromatograph means connecting the input to said reference cell to a source of carrier gas identical to that used in said gas chromatograph, a housing connected to said base plate and enclosing said furnace element, sample and reference cells means interconnecting the ends of said sample and reference cells to said housing to suspend the same within each respective cylindrical section without making physical contact therewith and a thermal insulated packing disposed to fill the space surrounding said furnace element and within said housing.

12. An infrared spectrometer as in claim 11 in which said sample cell and reference cell are identically constructed and each include an elongate tubular member having a passageway therethrough said passageway being defined by an interiorly facing wall having a highly reflective coating thereon to a radiation and infrared portion of the spectrum the ends of said tubular member terminating in substantially parallel flat planes, a pair of end plates each of said end plates having a recess therein carrying an o-ring for sealing engagements with a respective end of said tubular member said end plates further extending laterally away from said tubular member a sufficient distance to permit exterior interconnection of said end plates tensioning means interconnected between said end plates for applying slight tension to maintain said end plates in sealing engagement with said tubular member said tensioning means being symmetrically distributed about each of said end plates and having a thermal coefficient of expansion substantially identical to that of said tubular member whereby heating of the assembly does not cause any substantial thermal strain to develop in said part.

13. A cell construction as in the claim 12 further including an end cap having an aperture therein means for securing said end cap to said end plate an o-ring seal formed in the outer wall of said end plate and a window disposed between said window retaining cap and said end plate and means for urging said window to into engagement with said second o-ring.

14. An infrared spectrometer as in claim 1 in which said sample and reference cell each comprises an elongate tubular member having a passageway therethrough said passageway being defined by an interiorly facing wall having a highly reflective coating thereon to a radiation and infrared portion of the spectrum the ends of said tubular member terminating in substantially parallel flat planes, a pair of end plates each of said end plates having a recess therein carrying an o-ring for sealing engagements with a respective end of said tubular member said end plates further extending laterally away from said tubular member a sufficient distance to permit exterior interconnection of said end plates tensioning means interconnected between said end plates for applying slight tension to maintain said end plates in sealing engagement with said tubular member said tensioning means being symmetrically distributed about each of said end plates and having a thermal coefficient of expansion substantially identical to that of said tubular member whereby heating of the assembly does not cause any substantial thermal strain to develop in said part.

15. A cell construction as in claim 14 further including an end cap having an aperture therein means for securing said end cap to said end plate an o-ring seal formed in the outer wall of said end plate and a window disposed between said window retaining cap and said end plate and means for urging said window into sealing engagement with said second o-ring.

16. A spectrometer as in claim 1, further including means for disabling all circuits to hold the last values obtained just before entering the $4.2\mu$ $CO_2$ absorption region and maintaining these values until the scan has passed this region.

17. A sample or reference cell adapted for use in infrared spectrometer for passing the output of a gas chromatograph therefor for spectral absorption analysis comprising an elongate tubular member of optical grade glass having a passageway therethrough, said passageway being defined by an interiorly facing wall having a highly reflective coating thereon to a radiation and infrared portion of the spectrum, the ends of said tubular member terminating in substantially parallel flat planes, a pair of end plates each of said end plates having a recess therein carrying an O-ring for sealing engagements with a respective end of said tubular member, said end plates further extending laterally away from said tubular member a sufficient distance to permit exterior interconnection of said end plates, metal rod tensioning means interconnected between said end plates for applying slight tension to maintain said end plates in sealing engagement with said tubular member said tensioning means being symmetrically distributed about each of said end plates and having a thermal coefficient of expansion substantially identical to that of said tubular member whereby heating of the assembly does not cause any substantial thermal strain to develop in said part.

18. A cell construction as in Claim 17 further including an end cap having an aperture therein, means for securing said end cap to said end plate, an O-ring seal formed in the outer wall of said end plate, a window disposed between said window retaining cap and said end plate, and means for urging said window into sealing engagement with said second O-ring.

19. A sample or reference cell as in Claim 17 in which said tubular member is constructed of four symmetrically disposed elements of optical grade glass, each having an interior coating and assembled to form an overlapping pattern in which straight tubular passageway is formed having a square cross-section, the interfaces between segments being surface roughened, bevels formed at the outer edge of each interface to form glue line troughs and a chemically inert, high temperature, non-porous glue line run continuously down each trough.

20. A sample and reference gas cell furnace assembly, a framework including a base a furnace element, a furnace element made up of thermally conductive material, insulator support means for mounting said furnace element in upstanding relation on said base said furnace element being integral casting having spaced hollow cylindrical sections forming passageways therethrough, a web interconnecting said cylindrical sections to form a symmetric structure, a heater symmetrically mounted on side of said web, a sample cell disposed in one tubular section, a reference cell disposed in the other tubular section, means interconnecting an input of said sample cell through a source to the output of a gas chromatograph means connecting the input to said reference cell to a source of carrier gas identical to that used in said gas chromatograph, a housing connected to said base plate and enclosing said furnace element, sample and reference cells, means interconnecting the ends of said sample and reference cells to said housing to suspend the same within each respective cylindrical section without making physical contact therewith, and a thermal insulated packing disposed to fill the space surrounding said furnace element and within said housing.

* * * * *